(12) United States Patent
Dudurovic et al.

(10) Patent No.: US 10,663,098 B2
(45) Date of Patent: May 26, 2020

(54) DISMANTLING JOINT

(71) Applicants: Mile Dudurovic, Nundah (AU); Allan Bushell Deans, Oxley (AU)

(72) Inventors: Mile Dudurovic, Nundah (AU); Allan Bushell Deans, Oxley (AU)

(73) Assignee: Steel Mains Proprietary Limited, Somerton (AU)

( * ) Notice: Subject to any disclaimer, the term of this patent is extended or adjusted under 35 U.S.C. 154(b) by 66 days.

(21) Appl. No.: 15/105,860

(22) PCT Filed: Dec. 18, 2014

(86) PCT No.: PCT/AU2014/001145
§ 371 (c)(1),
(2) Date: Jun. 17, 2016

(87) PCT Pub. No.: WO2015/089562
PCT Pub. Date: Jun. 25, 2015

(65) Prior Publication Data
US 2017/0030501 A1 Feb. 2, 2017

(30) Foreign Application Priority Data
Dec. 19, 2013 (AU) .................. 2013904974

(51) Int. Cl.
*F16L 27/10* (2006.01)
*F16L 23/00* (2006.01)
(52) U.S. Cl.
CPC ......... *F16L 27/1021* (2013.01); *F16L 23/003* (2013.01); *F16L 23/006* (2013.01)
(58) Field of Classification Search
CPC .... F16L 27/1021; F16L 23/003; F16L 23/006

USPC ......... 285/363–364, 368, 405–406, 412, 414
See application file for complete search history.

(56) References Cited

U.S. PATENT DOCUMENTS

| 6,659,511 | B2 | 12/2003 | Yoneyama et al. |
| 7,735,208 | B2 | 6/2010 | Chou et al. |
| 2011/0101671 | A1 | 5/2011 | Dixon |

FOREIGN PATENT DOCUMENTS

| CN | 2585002 Y | 11/2003 |
| CN | 2585003 Y | 11/2003 |
| CN | 202274221 U | 6/2012 |
| CN | 202629413 U | 12/2012 |

(Continued)

*Primary Examiner* — Anna M Momper
*Assistant Examiner* — Fannie C Kee
(74) *Attorney, Agent, or Firm* — The Small Patent Law Group LLC; Jason P. Gross

(57) ABSTRACT

A dismantling joint for joining a first pipeline component to a second pipeline component including a first half and a second half, the first half including a cylindrical spigot having an outer face and a flange extending outwardly from the outer face of the spigot, the flange having an inner face and an outer face remote from the inner face, and the second half including a socket adapted to slidably receive therein the spigot of the first half, the socket having a proximal end and a distal end remote from the proximal end, the proximal end being opposed to the inner face of the flange of the first half; and forcing means arranged between the inner face of the flange of the first half and the proximal end of the spigot to engage the inner face of the flange of the first half and the proximal end of the socket of the second half adjacent the outer face of the spigot to force the first and second halves away from each other.

15 Claims, 6 Drawing Sheets

(56) References Cited

FOREIGN PATENT DOCUMENTS

| | | |
|---|---|---|
| DE | 610674 C | 3/1935 |
| DE | 3515169 A1 | 11/1985 |
| GB | 2016626 A | 9/1979 |

DISMANTLING JOINT

FIELD OF THE INVENTION

THIS invention relates to pipelines and pipeline components and methods of joining pipes terminated by flanges and flanged pipeline components. The invention has particular application to components known as "dismantling joints" especially in large high pressure pipelines but it can have application in low pressure pipelines.

BACKGROUND ART

Large pipelines typically include a plurality of flanged pipes joined to one another by bolts which pass through the flanges and hold the flanges together. Similarly, components such as valves, pumps and the like are often provided in the pipeline and they also have matching flanges which are joined to the pipe flanges in the same manner. Maintenance and servicing of a pipeline and its components often requires removal and replacement of a length of pipe or a component. It will be appreciated that removal of lengths of pipe or components can be difficult with large pipelines especially where the pipeline is underground or held in place by steel or concrete structures so that the pipeline cannot be axially or laterally moved. Such pipelines generally include dismantling joints between selected pipes or selected components which can be shortened for installation and removal and lengthened once in place to close the gap between the adjacent pipe flanges or component flanges as the case may be.

The presently known dismantling joints typically include two telescoping pipe or tube portions with flanges which correspond in size to the pipe flanges and they are held in place by bolts which pass through the adjacent pipe flanges (or component flanges) and through the corresponding flanges of the dismantling joint.

That arrangement can result in bending of the pipe flanges, known as "flange rotation" (a type of "cupping" of the adjacent flanges in the axial direction). Consequently, dismantling joints have require undesirably large heavy flanges to carry the applied loads.

Moreover, the removal or replacement of an existing dismantling joint is complicated and time-consuming because it is necessary to remove all of the tie-bolts that are used to secure the dismantling joint to adjacent pipeline components before the dismantling joint can be removed or replaced. Access to the nuts and/or bolts also requires dismantling joints to be undesirably long in the axial direction.

Additionally, when a dismantling joint is installed, there could be some misalignment between the faces of the flanges of the dismantling joint and the mating faces of the adjacent flanges of the pipeline. In existing arrangements, such misalignment is normally taken up by gaskets, but this approach is known to produce an inferior seal for the joint structurally and from the aspect of seal integrity.

The present invention is aimed at ameliorating at least one of the problems of presently known dismantling joints. The invention is also aimed at providing a dismantling joint which is reliable and efficient in use.

With the foregoing in view the present invention, in one aspect, resides broadly in a dismantling joint for joining a first pipeline component to a second pipeline component, the first and second pipeline components being connectable to one another along a common axis by a plurality of connectors spaced from the axis and each pipeline component having a sealing face opposed to the other, the dismantling joint including:

a first half and a second half, each half having a central axis, and the first half including a cylindrical spigot having an outer face and a flange extending outwardly from the outer face of the spigot, the flange having an inner face and an outer face remote from the inner face, and the second half including a socket adapted to slidably receive therein the spigot of the first half, the socket having a proximal end and a distal end remote from the proximal end, the proximal end being opposed to the inner face of the flange of the first half; and forcing means arranged between the inner face of the flange of the first half and the proximal end of the spigot to engage the inner face of the flange of the first half and the proximal end of the socket of the Second half adjacent the outer face of the spigot to force the first and second halves away from each other and into sealing engagement with the sealing faces of the pipeline components, and wherein the forcing means is arranged about a pitch circle spaced from the central axes such that the spacing of the pitch circle is less than the spacing of the connectors when the central axes of the dismantling joint are aligned with the common axis of the pipeline components.

In another aspect, the present invention resides broadly in a dismantling joint for joining a first pipeline component to a second pipeline component, the first and second pipeline components being connectable to one another along a common axis by a plurality of connectors spaced from the axis and each pipeline component having a sealing face opposed to the other, the dismantling joint including:

a first half and a second half, each half having a central axis, and the first half including a cylindrical spigot and a flange extending outwardly therefrom, the flange having an inner end and an outer end remote from the inner end, the second half including a socket adapted to slidably receive the spigot of the first half, the socket having a proximal end and a distal end remote from the proximal end, the proximal end being opposed to the inner end of the flange of the first half; and forcing means arranged to engage the inner end of the flange of the first half and the proximal end of the socket of the second half adjacent the outer face of the spigot to force the first and second halves away from each other and into sealing engagement with the sealing faces of the pipeline components, and wherein the forcing means is arranged about a pitch circle spaced from the central axes such that the spacing of the pitch circle is less than the spacing of the connectors when the central axes of the dismantling joint are aligned with the common axis of the pipeline components.

Preferably, the forcing means includes a plurality of bolts or screws each threadedly engaged with a threaded passage extending axially through either the flange or the socket such that the head of each bolt or screw abuts the other one of the proximal end or inner face respectively. However, it will be appreciated that the forcing means may take other forms, such as, but not limited to, a plurality of rods which extend between the inner end of the flange of the first half and the proximal end of the socket of the second half, each rod having location means for locating the rods in a radially and circumferentially fixed position with respect to both the flange and socket, and each rod further having threaded portions upon which two nuts are threadedly engaged to be wound away from one another against the inner end of the flange and the proximal end of the socket. The bolts or screws are arranged in circumferentially spaced disposition adjacent the outer face of the spigot, meaning relatively close to the outer face and such that the axial compressive force is exerted close to, or even in substantial alignment with, the pipe wall or equivalent thereto of the pipeline components being joined to one another. By being joined to one another, it will be appreciated that the pipeline components are joined in axially spaced disposition with the dismantling joint interposed between them.

It will be seen that the axial or longitudinal compressive force of the forcing means is directed against the flanges of the pipeline components at each end of the dismantling joint, the compressive force being taken up by tie bolts joining the pipeline components to one another.

In another aspect, the present, invention resides broadly in a dismantling joint for interposition between a first pipeline component and a second pipeline, component joined to one another by pipeline fasteners, the first and second pipeline components being connectable to one another along a common axis by a plurality of connectors spaced from the axis and each pipeline component having a sealing face opposed to the other, the dismantling joint including:

a flanged spigot having a central axis and a flange and a spigot having an internal passage extending therethrough;

a flange adaptor having a central axis and an internal bore for receiving the spigot;

sealing means interposed between the flange and the flange adaptor for sealing against fluid flow from the internal passage of the flanged spigot;

compression means adapted for interposition between the flange of the flanged spigot and the flange adaptor, the compression means, being operable to impart an axial compressive load therebetween; and wherein the flange and the flange adaptor are adapted to function independently of the pipeline fasteners and into sealing engagement with the sealing faces of the pipeline components, and wherein the compression means is arranged about a pitch circle spaced from the central axes such that the spacing of the pitch circle is less than the spacing of the connectors when the central axes of the dismantling joint are aligned with the common axis of the pipeline components.

In another aspect, the present invention resides broadly in a method of dismantlably joining a first pipeline component to a second pipeline component by pipeline fasteners including:

providing a flanged spigot having a flange and a spigot having an internal passage extending therethrough;

receiving an end of the flange remote from the flange into an internal bore of a flange adaptor;

sealing the flange adaptor and flange against fluid flow from the internal passage of the flanged spigot to provide an axially expansible flanged assembly;

operatively interposing the flanged assembly between the flanges of the first and second flanged components; and imparting an axial compressive load between the flange and the flange adaptor independently of the pipeline fasteners.

Preferably, the flange and spigot of the first half are integrally formed and may be in the form of the flanged spigot hereinbefore described. It is also preferred that the flange is at or near one end of the spigot. However, it will be appreciated that the flange and spigot may be separate components having sealing means operatively interposed between the components to seal against fluid flow from the internal passage through the spigot, that is, providing a sealing between the flange and the cylindrical outer face of the spigot.

Preferably, the sealing means includes a seal and a follower for pressing the seal against the spigot and the flange adaptor. In such form, the follower is in the form of a ring having dimensions substantially commensurate with the dimensions of the flange adaptor.

Preferably, the compression means includes a plurality of threaded rods and complementary threaded apertures extending axially into or through either, ox both the flange and the flange adaptor. In a preferred form, the threaded rods are provided in the form of bolts having a threaded portion, a non-threaded portion extending axially from the threaded portion and a compression face on the end of the non-threaded portion remote from the threaded portion. The non-threaded portion suitably includes two or more engagement faces for operable association with a wrench or the like far turning the bolts about their axes. Preferably, the compression faces of the bolts are domed to a degree sufficient to permit engagement with a bearing face of the follower substantially centrally of the compression faces notwithstanding engagement with the bearing faces at an angle slightly off perpendicular.

It will be seen that the compressive load may be imparted by turning the bolts in a direction which unscrews them from the complementary apertures in or through the flange and/or flange adaptor. Preferably, a lock nut is provided on each bolt for locking against rotation of the bolt once the desired compressive load has been provided by the unscrewing of the bolts.

The flange adaptor may include a rebate or groove for receiving the seal. Preferably, the dismantling joint includes a seal containment ring that surrounds the seal. In a preferred form, the follower includes a plurality of threaded holes. A relief ring may also be provided for operable interposition between the flange adaptor and the seal containment ring. The relief ring includes a plurality of clearance holes sized to permit axial penetration of the bolts therethrough, it being preferred that the clearance holes in the relief ring extend longitudinally all of the way through the relief ring. It is also preferred that the follower further includes a seal backing plate ring located between the relief ring and the flange adaptor.

Alternatively, the follower includes a plurality of apertures, each of which has a threaded portion and an unthreaded clearance portion. It is also preferred that the apertures extend longitudinally all of the way through the follower. It will be appreciated that the threaded apertures may be provided in an alternative form by incorporating a captured nut in a clearance aperture for each or any one of the threaded apertures.

The first and second flanged components may be selected from a pipeline, a valve, a pump, a joint or the like. Moreover, the flanged spigot or the flange adaptor may be incorporated into one end of a pipeline fitting such as a pump, valve, joint or the like to enable the fitting to be removed from the pipeline in similar manner to having the dismantling joint hereinbefore described provided separately in axial interposition between a pipeline flange and a flange on the pipeline fitting.

In another aspect, the present invention resides broadly in a dismantling joint for joining a first pipeline component to a second pipeline component, the first and second pipeline components being connectable to one another along a common axis by a plurality of connectors spaced from the axis and each pipeline component having a sealing face opposed to the other, the dismantling joint including:
- a flanged spigot;
- a flange adaptor that receives the flanged spigot;
- a seal for sealing between the flanged spigot and the flange adaptor;
- a follower for pressing the seal against the flanged spigot and the flange adaptor; and
  - a plurality of bolts spaced about a central axis and screwed into a plurality of threaded holes such that the bolts extend longitudinally between the flanged spigot and the follower such that the bolts are able to be partially unscrewed so that they are thereby able to move the flanged spigot and the follower away from each other so that the flanged spigot is able to press a first gasket against the first pipeline component, the flange adaptor is able to press a second gasket against the second pipeline component, and so that the follower is able to press the seal against the flanged spigot and the flange adaptor, and so that the flanged spigot and flange adaptor may be pressed into sealing engagement with the sealing faces of the pipeline components, and wherein
- the bolts are arranged about a pitch circle spaced from the central axis such that the radius of the pitch circle is less than the spacing of the connectors from the common axis when the central axis of the dismantling joint is aligned with the common axis of the pipeline components.

BRIEF DESCRIPTION OF THE DRAWINGS

In order that the invention may be more readily understood and put into practice, preferred embodiments thereof will now be described, along with a description of a dismantling joint according to the prior art, with reference to the accompanying drawings, in which.

DESCRIPTION OF EMBODIMENTS

Figure 1:
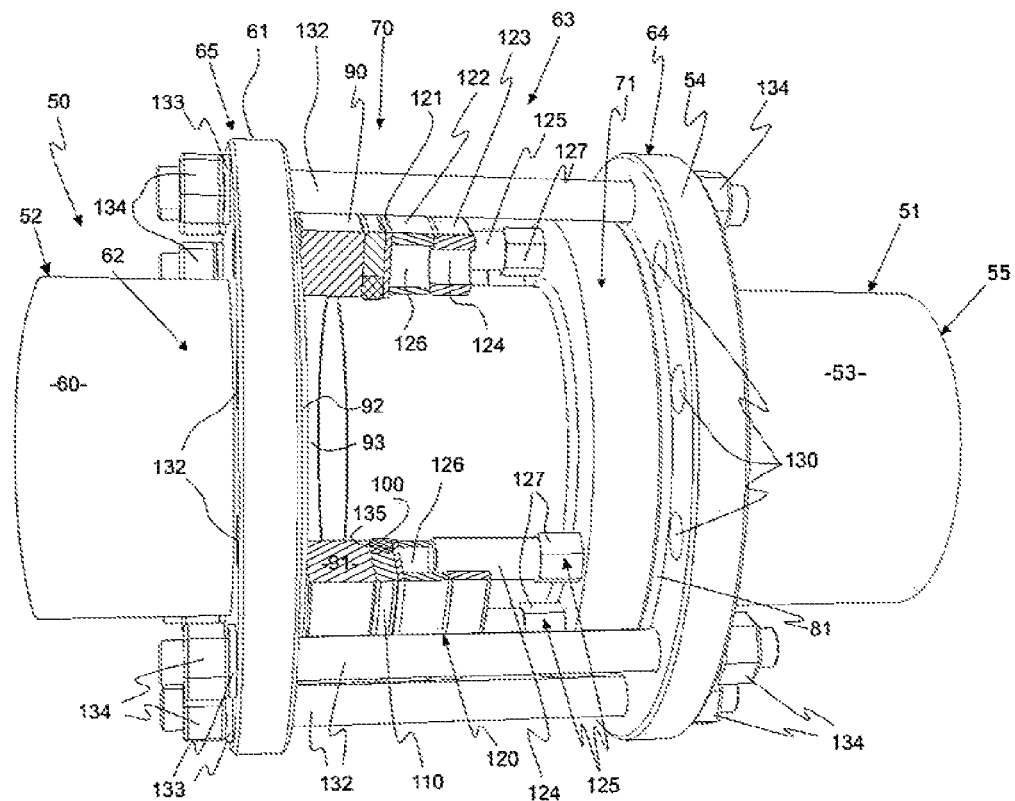
FIG. 1 is a partial cross-sectional view of pipeline incorporating a first dismantling joint according to the invention.

In the drawings, like features have been referenced with the same reference numbers. The pipeline 50 illustrated in FIG. 1 includes a first pipeline component 51, and a second pipeline component 52. The first pipeline component 51 includes a pipe 53, and a flange 54 that is secured to an end of the pipe 53. The second pipeline component 52 includes a pipe 60, and a flange 61 that is secured to an end 62 of the pipe 60. The flanges 54, 61, which are separated from each other by a gap 63, function as an end 64 of the first component 51, and an end 65 of the second component 52 respectively.

The first dismantling joint 70, which is located in the gap 63, joins the end 64 of the first component 51 to the end 65 of the second component 52 so that fluid is able to flow through the pipeline 50 from, the pipe 53 and into the pipe 60 through the joint 70, and vice versa. The joint 70 includes a flanged spigot 71 that includes a spigot or pipe 72 that is welded or otherwise secured to a flange 73 such that the flange 73 is located adjacent an end of the pipe 72. A first gasket 80 is located between the flange 73 of the flanged spigot 71 and a raised face 81 of the flange 54.

A flange adaptor 90 includes a flange 91 and receives the flanged spigot 71 such that the pipe 72 of the flanged spigot 71 is received by the flange 91. A second gasket 92 is located between the flange 91 of flange adaptor 90 and a raised face 93 of the flange 61.

An elastomeric ring seal 100 forms a watertight seal between the pipe 72 of the flanged spigot 71 and the flange 91 of the flange adaptor 90. The ring seal 100 is surrounded by a seal containment ring 110 which, like the ring seal 100, abuts the flange 91 of the flange adaptor 90. The seal containment ring 110 inhibits the ring seal 100 from expanding radially outward when the seal 100 is pressed against the flange 91. When the seal 100 is pressed against the flange 91, it is also pressed against the pipe 72 of the flanged spigot 71.

A follower 120 presses the seal 100 against the pipe 72 of the flanged spigot 71, and against the flange 91 of the flange adaptor 90 so that the ring seal 100 forms a watertight seal between the pipe 72 and the flange 91. The follower 120 includes a seal backing plate ring 121, a relief ring 122, and a threaded ring 123. The threaded ring 123 includes a plurality of circumferentially spaced threaded holes 124 that extend longitudinally through the threaded ring 123. A specially machined compression bolt 125 having a threaded shank head 127 is screwed into each hole 124 to extend longitudinally between the threaded ring 123 of the follower 120 and the flange 73 of the flanged spigot 71.

The relief ring 122 includes a plurality of circumferentially spaced clearance holes 126 that extend longitudinally through the relief ring 122. Each hole 126 is aligned with a respective threaded hole 124 of the threaded ring 123, and is dimensioned for clearance fit of the threaded shank of the bolt 125 that is screwed into the threaded hole 124 when so aligned.

The bolts 125 may be partially unscrewed from the threaded ring 123 such that the head 127 of each bolt 125 presses against the flange 73 of the flanged spigot 71 to move the flanged spigot 71 and the flange adaptor 90 away from each other. In particular, after the bolts 125 are unscrewed from the threaded ring 123 so that their heads 127 contact the flange 73, further unscrewing of the bolts 125 causes the threaded ring 123 of the follower 120 to move away from the flange 73.

As the threaded ring 123 moves away from the flange 73, it pushes the relief ring 122 of the follower 120 away from the flange 73, which in turn pushes the seal backing plate ring 121 of the follower 120 away from the flange 73. The seal backing plate ring 121 in turn pushes the seal 100, and the seal containment ring 110 away from the flange 73, and the seal 110 and seal containment ring 110 push the flange 91 of the flange adaptor 90 away from the flange 73.

Unscrewing all of the bolts 125 by a sufficient and relatively even amount extends the joint 70 in the above-described manner so that the first gasket 80 is pressed against the raised face 81 of the flange 54 by the flange 73, the second gasket 92 is pressed against the raised face 93 of the flange 61 by the flange 91, and so that the seal 100 is pressed against the flange 91 and the pipe 72 by the seal backing plate ring 121 of the follower 120.

A predetermined amount of torque is applied to each one of the bolts 125 to ensure adequate compression of the ring seal 100, and to clamp the gaskets 80, 92 securely between the flanges 73, 54, and 61, 91, respectively. Full compression of the ring seal 100 results in the seal 100 providing a leak-proof seal between the flanged spigot 71 and the flange adaptor 90.

The seal backing plate ring 121 prevents the bolts 125 from being screwed into and damaging the seal 100. The ring 121 is made to have a close fit with the outside diameter of the pipe 72 of the flanged spigot 71 to prevent loss of compression of the elastomeric seal 100 through longitudinal extrusion of the compressed seal 100 between the gap between the pipe 72 and the relief ring 122.

A plurality of circumferentially spaced holes 130 extend longitudinally through the flange 54, and a plurality of circumferentially spaced holes 131 extend longitudinally through the flange 61. Each hole 130 is aligned with a respective hole 131. The dismantling joint 70 is further secured in position, and the components 51, 52 are secured to each other, by a plurality of tie-bolts 132 that each extend longitudinally through a respective pair of aligned holes 130, 131, a plurality of washers 133 that receive the tie-bolts 132, and by a plurality of nuts 134 that are screwed onto the ends of the tie-bolts 132 and tightened. The washers 133 are located between the nuts 134 and the flanges 54, 61.

The nuts 134 are tightened so that the flanges 54, 61 are pulled towards each other, so that the gasket 80 is further compressed between the flanges 54, 73, and so that the gasket 92 is further compressed between the flanges 61, 91. The gaskets 80, 92 are further compressed so that the gasket 80 forms a seal between the flanges 54, 73, and so that the gasket 92 forms a seal between the flanges 61, 91. In particular, the gaskets 80, 92 are compressed by the amount required to ensure a leak-proof joint between the flanges 54, 73 and between the flanges 61, 91. The inner bolts 125 are subjected to a compressive stress not only as a result of their pressing against the flange 73, but also as a result of the flanges 54, 61 being pulled towards each other. The bolts 125 resist this entire external compressive load.

The follower 120 applies compression to the ring seal 100. The thickness of the ring seal 100 is such that, before it is compressed between the seal backing plate ring 121 of the follower 120 and the flange 91 of the flange adaptor 90, it protrudes from the bore of the seal containment ring 110 towards the follower 120. The seal 100 is able to be compressed between the seal backing plate ring 121 and the flange 91 until the seal containment ring 110 is in contact with both the flange 91 and the seal backing plate ring 121. Once the ring 110 is in contact with both the flange 91 and the ring 121 so that an annular cavity 135 defined by the flange 91, ring 110, and the ring 121 reaches its minimum size and volume, there are no gaps between the flange 91, the ring 110, and the ring 121 through which the seal 100 can escape. The seal containment ring 110 limits the amount by which the seal 100 is able to spread radially outward as it is compressed between the ring 121 and the flange 91. The compressed seal 100 spreads radially inward so that it is compressed against the pipe 72 of the flanged spigot 71 and forms a seal between the flange adaptor 90 and the flanged spigot 71.

Figure 2:
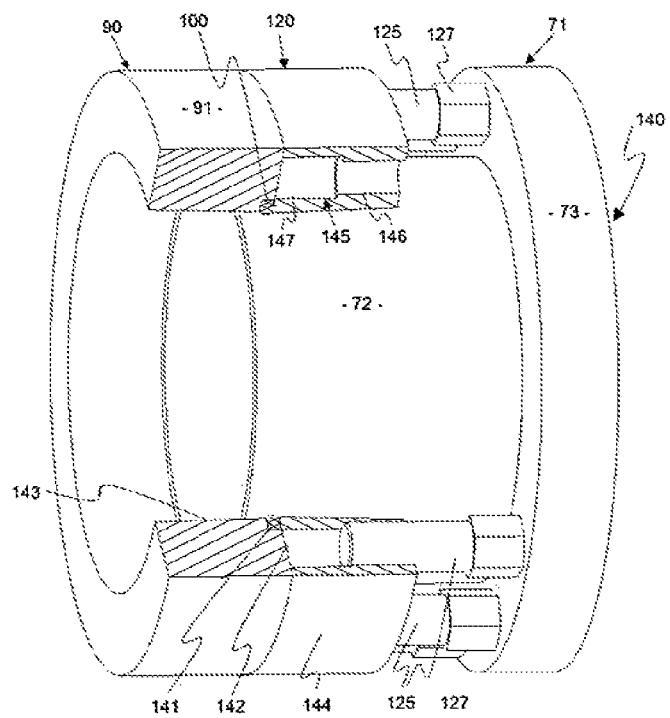
FIG. 2 is a partial cross-sectional view of a second dismantling joint according to the invention.

The dismantling joint 140 illustrated in FIG. 2 a simplified dismantling joint 140 that is identical with the dismantling joint 70 illustrated and described with reference to FIG. 1, except that, rather than including the seal containment ring 110, a groove 141 that receives the ring seal 100 is machined into or otherwise formed in a face 142 of the flange 91 such that the groove 141 extends along an inner circumference 143 of the flange 91.

Also, the seal backing plate ring 121, the relief ring 122 and the threaded ring 123 of the dismantling joint 70 have been dispensed with. Instead of the relief ring 122 and the threaded ring 123, the follower 120 of the dismantling joint 140 includes a modified threaded ring 144 in which the relief ring 122 and the threaded ring 123 of the joint 70 have been integrally formed as a single part. The threaded ring 144 includes a plurality of circumferentially spaced threaded holes 145 that extend longitudinally all of the way through the ring 144. Each hole 145 includes a threaded portion 146 and an adjoining non-threaded clearance portion 147.

The holes 145 in the threaded ring 144 do not overlie the seal ring 100. Consequently, there is no need for the dismantling joint 140 to include the seal backing plate ring 121 to protect the seal 100 from being damaged by the bolts 125, thereby permitting the sealing backing plate ring 121 to be omitted from the dismantling joint 140.

The bolts 125 of the dismantling joint 140 are screwed into the holes 145 such that the bolts 125 extend longitudinally between the follower 120 and the flange 73 of the flanged spigot 71. The flanged spigot 71 and the flange adaptor 90 of the dismantling joint 140 are able to be moved away from each other by unscrewing the bolts 125 in the same manner as described in relation to the dismantling joint 70.

Also, the dismantling joint 140 is able to be used to join two pipeline components in a similar manner to the dismantling joint 70. When the dismantling joint 140 joins two pipeline components in this way, the follower 120, which includes the threaded ring 144, presses the ring seal 100 into the groove 141 so that the seal 100 is pressed against the flange 91 of the flange adaptor 90 and against the pipe 72 of the flanged spigot 71 so as to form a leak-proof seal between the flange 91 and the pipe 72. Also, the bolts 125 are subjected to a compressive force. Although the dismantling joint 140 is simpler than the joint 70, the joint 70 has a significant advantage over the joint 140 in that the presence of the seal containment ring 110 in the joint 70 provides for easier removal of the seal 100 when dismantling the joint 70.

Figure 3:
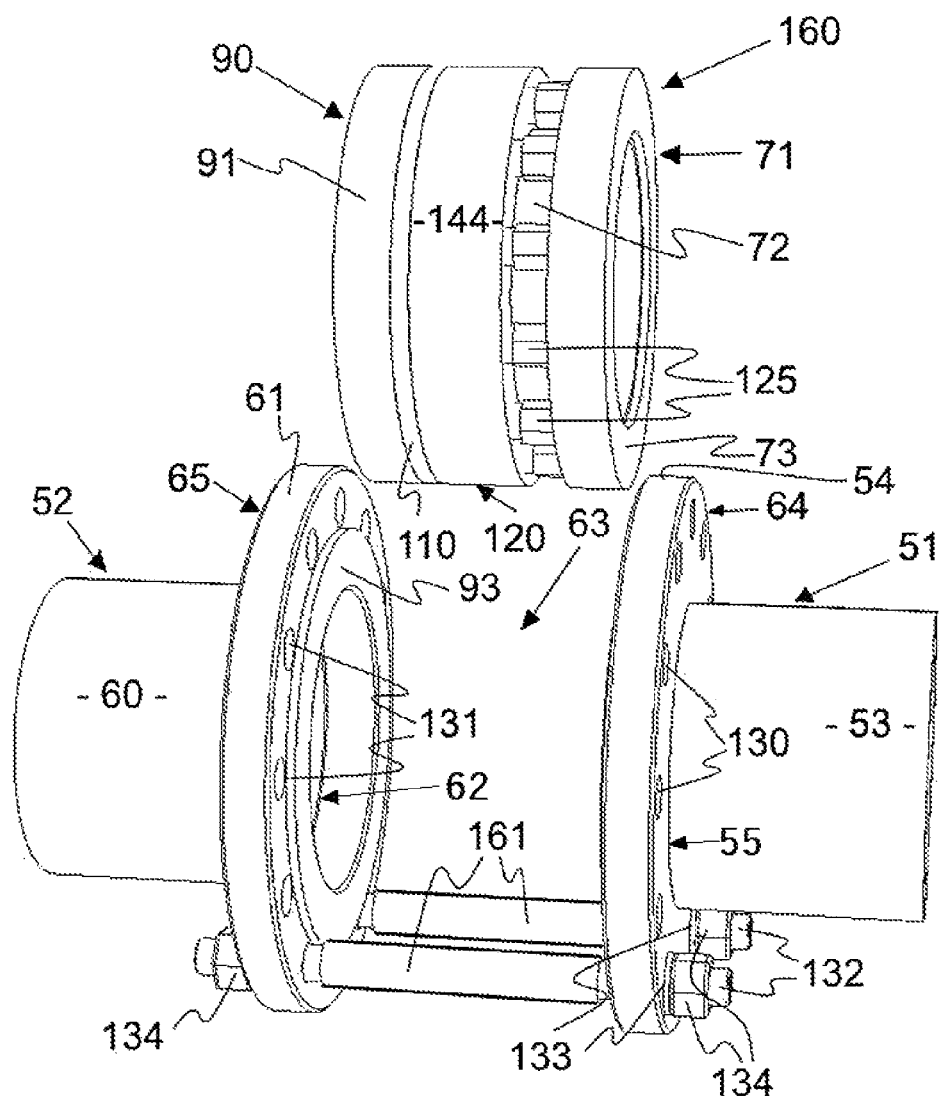
FIG. 3 is an exploded view of a third dismantling joint according to the invention in juxtaposition with two flanged components of a pipeline between which the dismantling joint may be inserted.

The dismantling joint 160 illustrated in FIG. 3 is depicted in juxtaposition with a first pipeline component 51 and a second pipeline component 52 for insertion therebetween. The dismantling joint 160 is identical with the dismantling joint 140 except that the flange 91 of the dismantling joint 160 does not include the groove 141 that receives the ring seal 100. Instead, the dismantling joint 160 includes the seal containment ring 110 of the dismantling joint 70 to surround the ring seal 100. Before the dismantling joint 160 is inserted into the gap 63 between the ends 64, 65 of the first and second pipeline components 51, 52, the components 51, 52 are secured to one another with a pair of tie-bolts 132.

Each tie bolt 132 extends longitudinally through a respective hole 130 in the flange 54 and a respective hole 131 in the flange 61, and is secured to the flanges 54, 61 by a pair of washers 133 through which the tie-bolt 132 is inserted, and a pair of nuts 134 that are screwed on to the ends of the tie-bolt 132. The tie-bolts 132 are positioned such that they are both located at the bottom of the components 51, 52.

Figure 7:
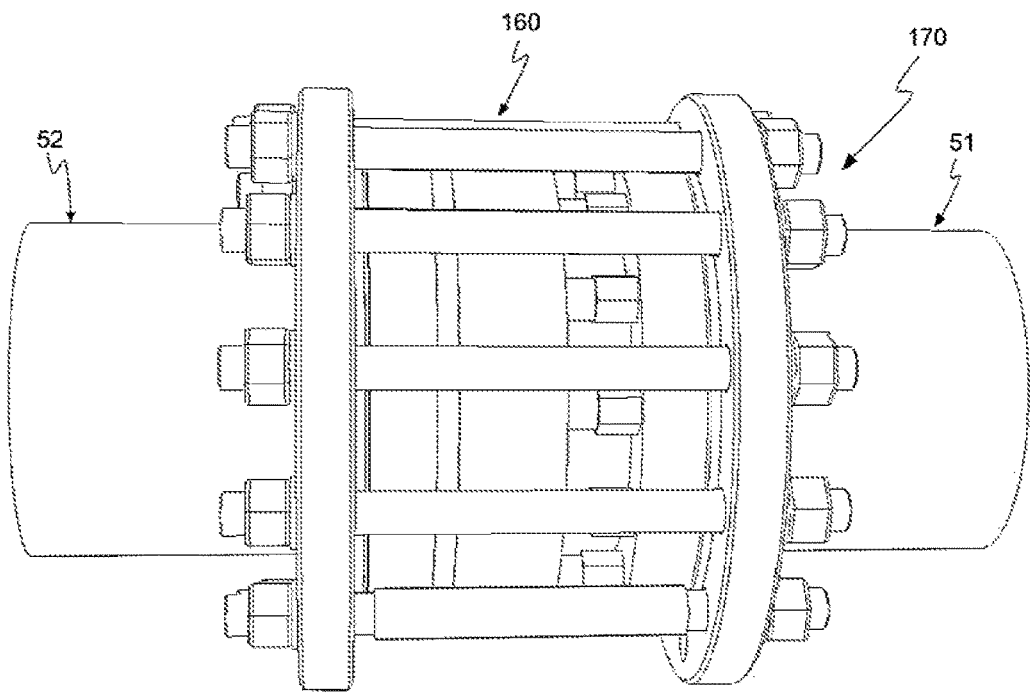

Each tie-bolt 132 extends through a respective spacer tube 161. The spacer tubes 161 support the dismantling joint 160 after it is inserted between the ends 64, 65 of the components 51, 52 as shown in FIG. 7. The wall thickness of each spacer tube 161 is such that the spacer tubes 161 support the dismantling joint 160 so that it is substantially concentric with the flanges 54, 61 and is substantially aligned with the pipeline components 51, 52. After the dismantling joint 160 has been inserted between the ends 64, 65 of the components 51, 52, the first gasket 80 is inserted between flange 73 of the flanged spigot 71 and flange 54 of the first component 51 so that the gasket 80 is positioned between flange 73 and the raised face 81 of flange 54. Also, the second gasket 92 is inserted between flange 91 of the flange adaptor 90 and the flange 61 of the second component 52 so that the gasket 92 is positioned between the flange 91 and the raised face 93 of flange 61. If the gaskets 80, 92 include holes for the tie-bolts 132 to extend through, the gaskets 80, 92 are installed prior to installing the first two tie-bolts 132 so that the tie-bolts 132 can be inserted through the holes in the gaskets 80, 92.

Figure 5:
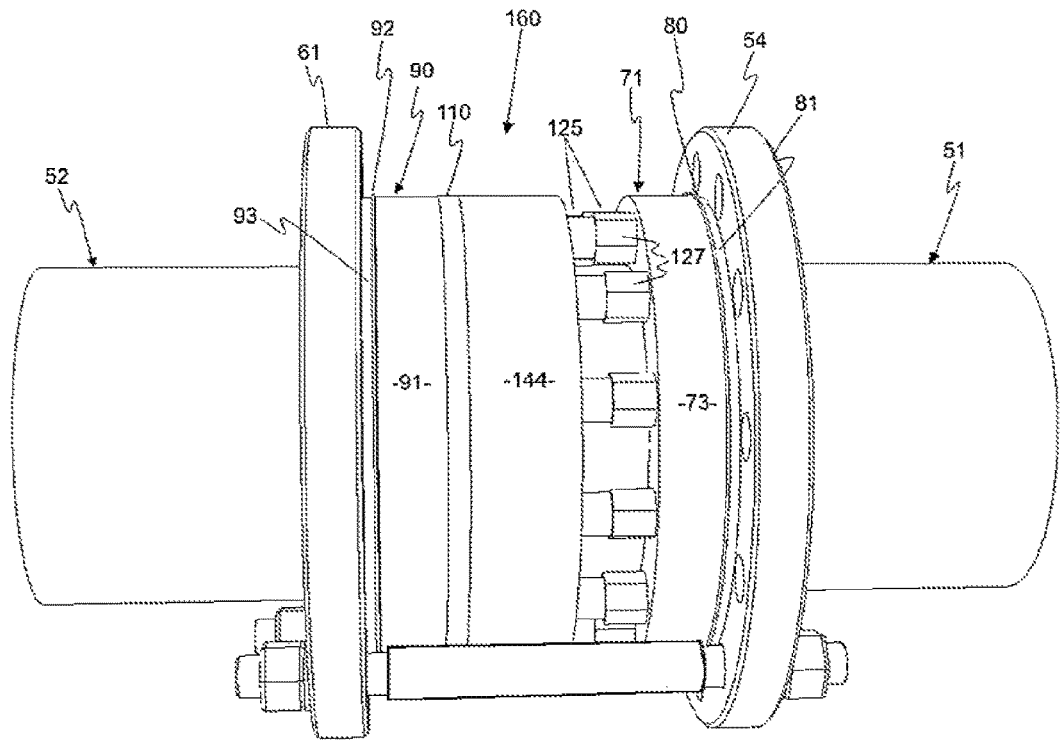

As illustrated in FIG. 5, once the gaskets 80, 92 have been installed in the aforementioned manner, the compression bolts 125 are partially unscrewed from the threaded ring 144 in sequence so that the bolt heads 127 press against the flange 73 of the flanged spigot 71 and cause the flanged spigot 71 and the follower 120 to move away from each other, which in turn causes the flange adaptor 90, which the follower 120 pushes against, to move away from the flanged spigot 71. The bolts 125 are unscrewed so that the first gasket 80 evenly contacts the flange 73 and the raised face 81 of the flange 54, and so that the second gasket 92 evenly contacts the flange 91 and the raised face 93 of the flange 61.

Figure 6:
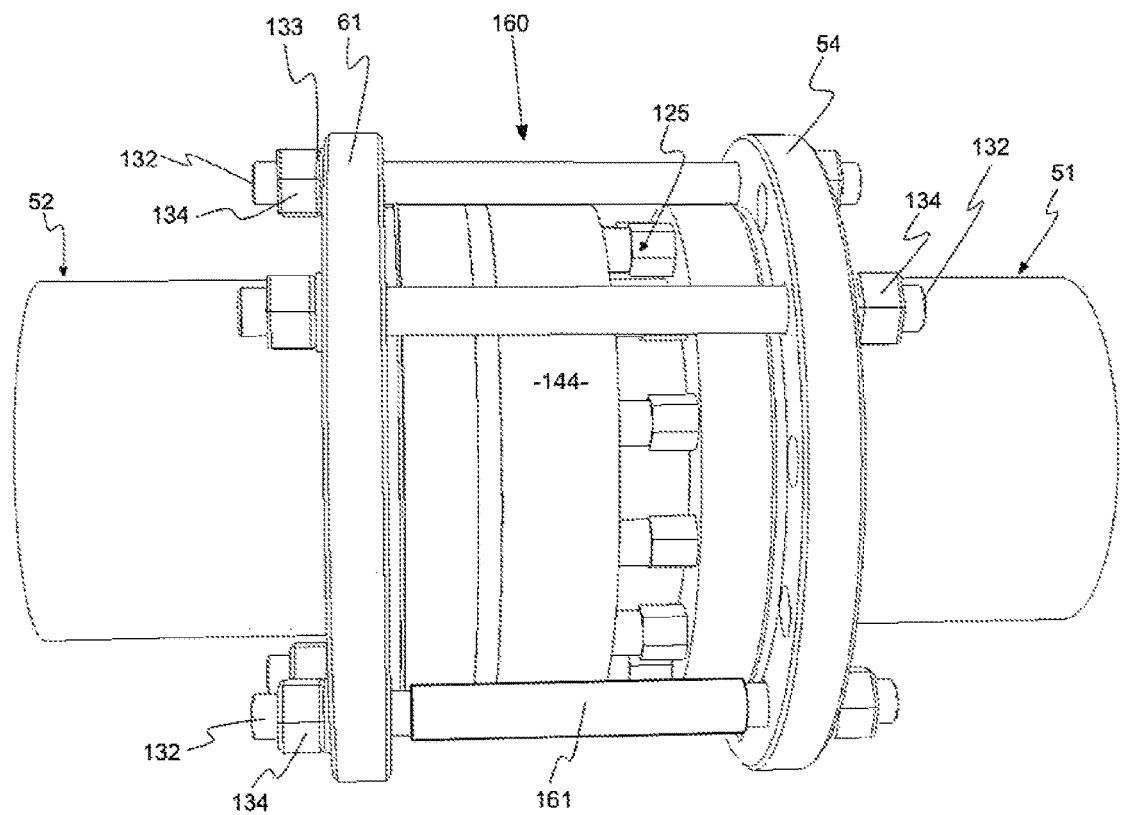

As illustrated in FIG. 6, the first and second pipeline components 51, 52 are joined to one another by some additional tie-bolts 132 and their associated washers 133 and nuts 134. The additional, tie-bolts 132 are located at circumferentially spaced positions around the dismantling joint 160 so that the installed tie-bolts 132 are able to effectively restrain the flanges 54, 61 against further unscrewing of the bolts 125. Once the additional tie-bolts 132 and their associated washers 133 and nuts 134 have been installed, all of the bolts 125 are further unscrewed from the threaded ring 144 to the required predetermined torque to ensure full compression of the ring seal 100, secure clamping of the gasket 80 between the dismantling joint 160 and the first component 51, and secure clamping of the gasket 92 between the dismantling joint 160 and the second component 52.

All of the remaining tie-bolts 132 and their associated washers 133 and nuts 134 are then fitted, and the nuts 134 torqued up to the required setting in accordance with approved procedures for the gaskets 80, 92 resulting in a completed pipeline portion 170 including the first component 51 joined to the second component 52 by the dismantling joint 160 as shown in FIG. 7. The nuts 134 are tightened so as to increase the compression of the gaskets 80, 92 to the value required to ensure a leak-proof joint. At this point, the bolts 125 resist the entire external load through compressive stress. Compression of the ring seal 100 between the flanged spigot 71 and the flange adaptor 90 occurs at the same time and in conjunction with the joint components, including the flanges 73, 91, follower 120, and bolts 125 going into compression. Consequently, unlike conventional dismantling joints, no additional tightening and retightening of the bolts 125 is required after the remaining tie bolts 132 and their nuts 134 have been installed.

The same basic installation procedure is used regardless of the size of the components, including the components 51, 52 and the dismantling joint 160. The procedure for installing the dismantling joint 160 as just described enables the joint 160 to be installed faster than dismantling joints of the prior art. It also results in a joint assembly that is more reliable than joint assemblies of the prior art. The procedure saves time in the field and is more cost effective compared with dismantling joints of the prior art. The reverse of the above-described procedure is used to uninstall the dismantling joint 160.

Figure 8:
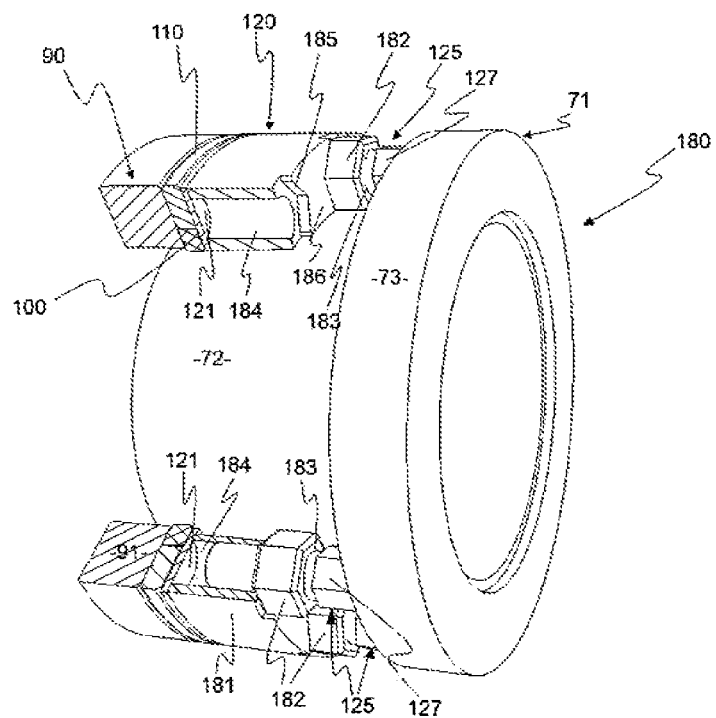
FIG. 8 is a side, partly cut-away view of a fourth dismantling joint according to the invention.

The dismantling joint 180 illustrated in FIG. 8 is identical with the dismantling joint 70 except that, the relief ring 122 and threaded ring 123 of the follower 120 have been dispensed with and replaced by a modified relief ring 181 and a plurality of nuts 182. Each bolt 125 is screwed into a threaded hole 183 in each nut 182. The relief ring 181 includes a plurality of circumferentially spaced clearance holes 184 that are each for receiving a threaded shank of a respective one of the bolts 125.

A plurality of circumferentially spaced recesses 185 are formed in an end face 186 of the relief ring 181. Each recess 185 is aligned with a respective one of the holes 184 and has a peripheral shape that allows one of the nuts 182 to be received therein and be restrained from rotating relative to the relief ring 181. This enables the flanged spigot 71 and the follower 120 to be moved away from each other by unscrewing the bolts 125 from the nuts 182 so that the joint 180 can join two pipeline components to each other. When the pipeline components are joined to each other, the bolts 125 are in compression. Incorporating the nuts 182 into the follower 120 enables the economic manufacture of the nuts in corrosion resistant material, similar to the compression bolts 125. The relief ring 181 could be economically produced by casting or machining.

Figure 9:
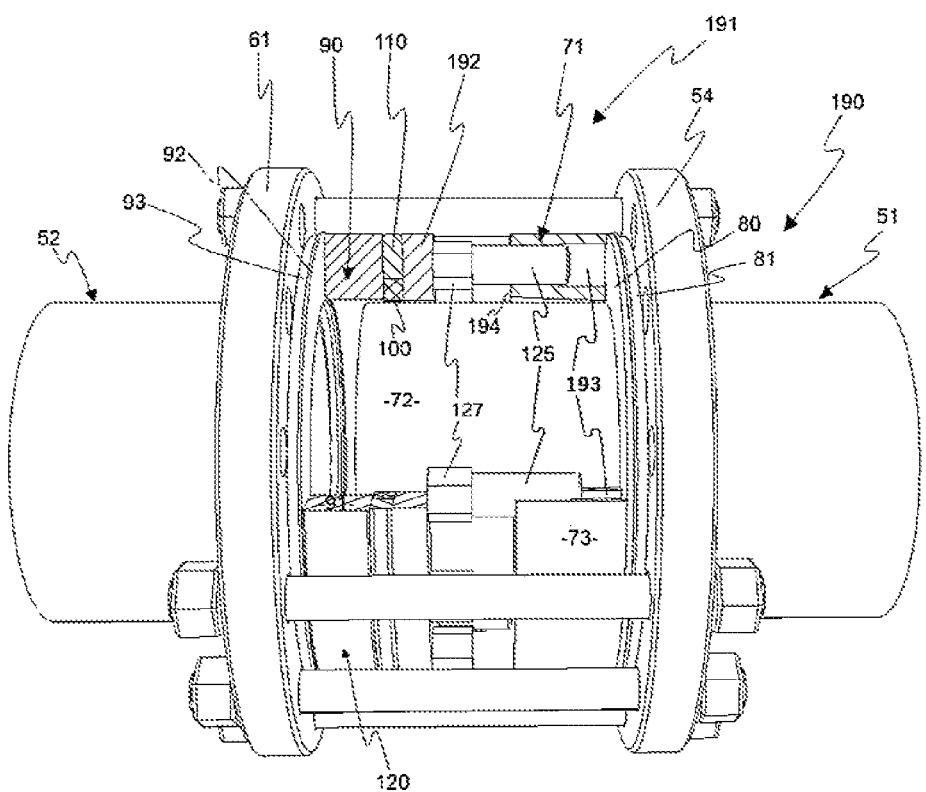
FIG. 9 is a side partly cut-away view of a pipeline incorporating a fifth dismantling joint according to the invention.

The portion of a pipeline 190 illustrated in FIG. 9 includes a dismantling joint 191 that joins a first pipeline component 51 and a second pipeline component 52. The dismantling joint 191 is identical with the dismantling joint 70 except that the follower 120 of the dismantling joint 191 replaces the follower 120 of the joint 70 with a thicker seal backing plate ring 192. In addition, the flange 73 of the flanged spigot 71 includes a plurality of circumferentially spaced threaded holes 193 in an end face 194 of the flange 73. The bolts 125 are screwed into the holes 193 so that the bolt heads 127 abut against the seal backing plate ring 192 as shown.

The bolts 125 are partially unscrewed from the flange 73 so that they press against the follower 120 which includes the seal backing plate ring 192 which in turn presses against the ring seal 100 so that the seal 100 forms a seal between the flange 91 of the flange adaptor 90 and the pipe 72 of the flanged spigot 71. A gasket 80 is pressed between the flange 73 of the flanged spigot 71 and a raised face 81 of a flange 54 of the first component 51. A gasket 92 is pressed between the flange 91 of the flange adaptor and a raised face 93 of the second component 52. Also, the bolts 125 are compressed.

Figure 10:
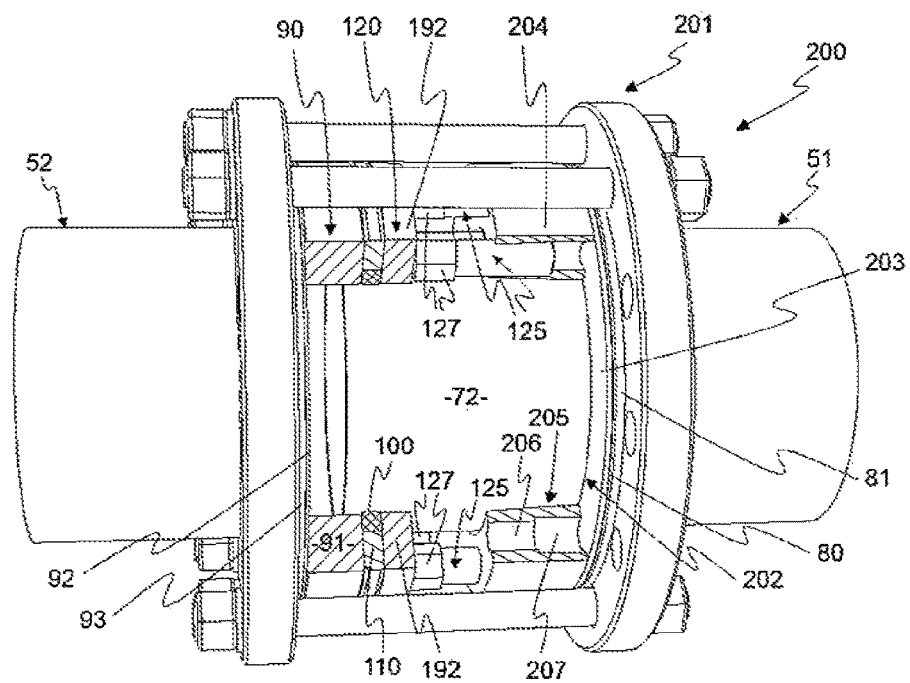
FIG. 10 is a side partly cut-away view of a pipeline incorporating a sixth preferred dismantling joint according to the invention.

The portion of a pipeline 200 illustrated in FIG. 10 includes a dismantling joint 201 that joins a first pipeline component 51 and a second pipeline component 52. The dismantling joint 201 is identical with the dismantling joint 191 except that the flanged spigot 71 of the dismantling joint 191 has been replaced with a modified flanged spigot 202 that is identical with the flanged spigot 71 except that it includes a thin flange 203 rather than the thicker flange 73 of the flanged spigot 71. The thin flange 203 does not include any threaded holes for the bolts 125 to screw into. In addition, the dismantling joint 201 includes a threaded ring 204 that receives the flanged spigot 202 and abuts against the thin flange 203.

A plurality of circumferentially spaced holes 205 extend longitudinally through the threaded ring 204. Each hole 205 includes a threaded portion 206 and an adjoining non-threaded clearance portion 207. The bolts 125 of the dismantling joint 201 are screwed into the holes 205 such that the bolts 125 extend longitudinally between the follower 120, which includes the seal backing plate ring 192, and the threaded ring 204, and such that the bolt heads 127 abut against the seal backing plate ring 192. Because the threaded ring 204 is situated beside the flange 203 of the flanged spigot 202, the bolts 125 effectively extend longitudinally between the follower 120 and the flanged spigot 202. The threaded ring 204 supports the thin flange 203 in a flat condition that provides a suitable face for the gasket 80 to seal against the raised face 81.

The bolts 125 of the dismantling joint 201 are partially unscrewed from the threaded ring 204 so that they press against the follower 120 which includes the seal backing plate ring 192 which in turn presses against the ring seal 100 so that the seal 100 forms a seal between the flange 91 of the flange adaptor 90 and the pipe 72 of the flanged spigot 202. A gasket 80 is pressed between the flange 203 of the flanged spigot 202 and a raised face 81 of a flange 54 of the first component 51. A gasket 92 is pressed between the flange 91 of the flange adaptor 90 and a raised face 93 of the second component 52. Furthermore, the bolts 125 are compressed. The dismantling joint 201 has the most compact design of all of the dismantling joints described herein. The manufacture of the various components of the joint 201 is simplified so that there is a minimum amount of welding required.

Figure 4:
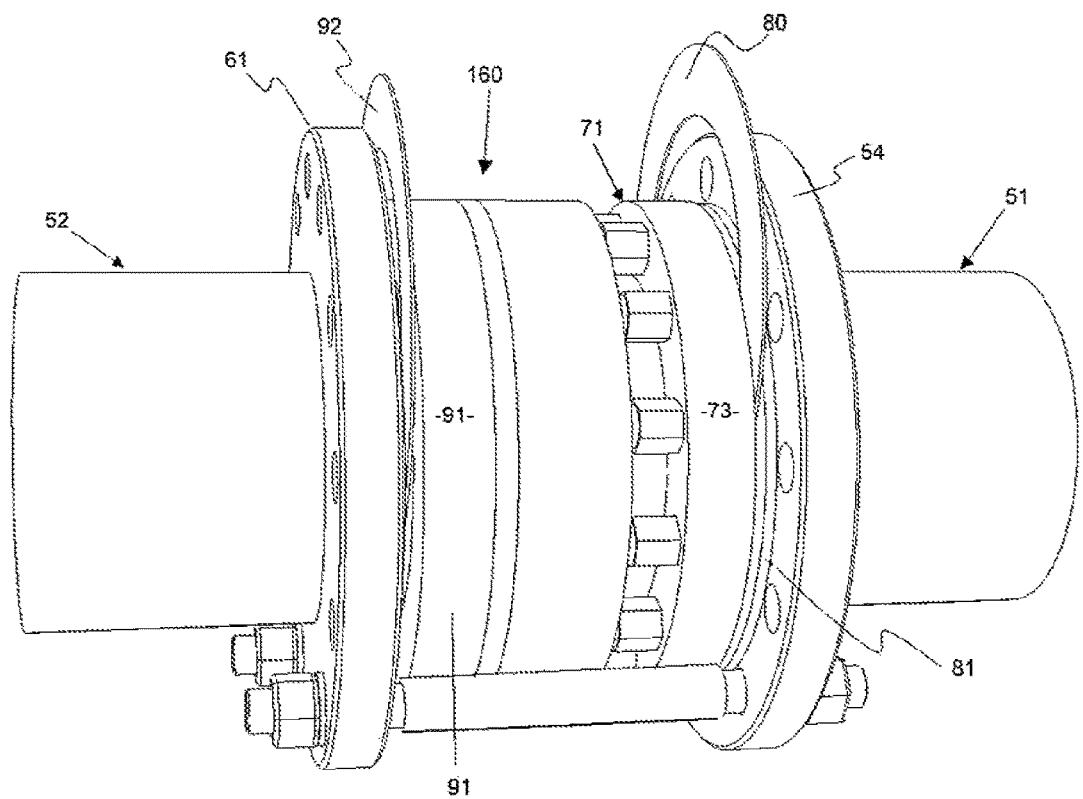
FIGS. 4 to 7 are side views of a pipeline incorporating the third dismantling joint illustrated in FIG. 3 in progressive states of assembly.
Figure 11:
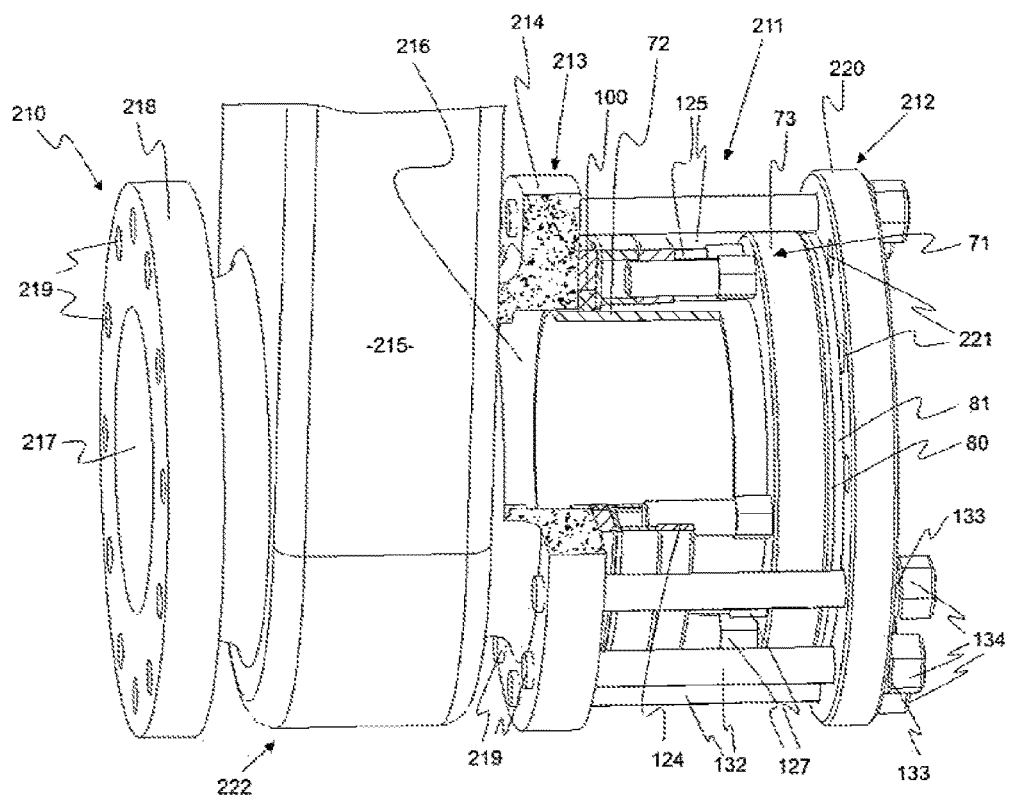
FIG. 11 is a side partly cut-away view of a dismantling joint according to the invention when joined to a pipeline component.

The portion of a pipeline valve 210 illustrated in FIG. 11 incorporates a dismantling joint 211. The valve 210 is shown joined to another pipeline component 212. The dismantling joint 211 is identical with the dismantling joint 70 depicted in FIG. 4 except that rather than including the flange adaptor 90 of the joint 70, the joint 211 includes a flange adaptor 213 that includes a flange 214. The flange 214 is part of a valve body 215, and surrounds a first opening 216 in the valve body 215. In addition to including the flange 214, the valve body 215 includes a second opening 217, and a flange 218 that surrounds the second opening 217. The flanges 214, 218 each include a plurality of circumferentially spaced threaded holes 219 that extend longitudinally through them.

The valve 210 is joined to the pipeline component 212 and to another pipeline component (not depicted) that is separated from the component 212 by a gap by positioning the valve 210 in the gap such that the flange 73 of the dismantling joint's flanged spigot 71 is located adjacent a flange 220 of the component 212 and such that the flange 218 of the valve body 215 is located adjacent the other component.

The valve 210 and the component 212 are secured to one another by screwing an end of each one of a plurality of tie-bolts 132 into a respective one of the threaded holes 219 in the flange 214, and the other end of each tie-bolt 132 is inserted through a respective one of a plurality of circumferentially spaced holes 221 that extend longitudinally through the flange 220. The ends of the tie-bolts 132 that extend longitudinally through the holes 221 are each inserted through a respective washer 133, and a respective nut 134 is then screwed on to each of those ends so that the valve 210 is thereby secured to the flange 220 of the component 212.

A first gasket 80 is positioned between the flange 73 and a raised face 81 of the flange 220, and a second gasket (not depicted) is positioned between the other component and the flange 218. The compression bolts 125 of the dismantling joint 211 are partially unscrewed from the threaded hole 124 of the dismantling joint 211 so that the bolt heads 127 press against the flange 73 of the flanged spigot 71 and cause the flanged spigot 71 and the flange adaptor 213 to move away from each other.

The bolts 125 are unscrewed, and the nuts 134 are tightened so that the first gasket 80 is compressed between the flange 73 and the raised face 81 of the flange 220 so that the gasket 80 forms a watertight seal between the flange 73 and the flange 220, and so that the second gasket is compressed between the flange 218 and the other component so that the second gasket forms a watertight seal between the flange 218 and the other component, and also so that the ring seal 100 of the dismantling joint 211 is compressed between the flange 214 of the flange adaptor 213 and the pipe 72 of the flanged spigot 71 so that the ring seal 100 forms a watertight seal between the flange adaptor 213 and the flanged spigot 71. Furthermore, the bolts 125 are compressed.

If the other component includes a flange, and the second gasket is positioned between that flange and the flange 218, the flange 218 may be secured to the flange of the other component in an appropriate manner so that, the second gasket forms a seal between the flange of the other component and the flange 218. For example, the flange 218 may be secured to the flange of the other component by a plurality of bolts that are each inserted through a respective hole in the flange of the other component and that are each screwed into a respective one of the threaded holes 219 of the flange 218. Joining the component 212 and the other component with the valve 210 results in a completed pipeline portion 222.

The dismantling joint according to the present invention uses considerably less material than prior, art dismantling joints. This is because it is significantly smaller in outside diameter and shorter in length compared with prior art dismantling joints. At the same time, the dismantling joint of the present invention may be rated for use at the same pressures as prior art dismantling joints. The reduction in the outside diameter of the dismantling joint according to the present invention is achieved because the joint does not have conventional flanges of the type that are adapted to be bolted to the flanges of the components to be joined to one another. The outside diameter is equivalent to the outer diameter of the raised faces of the mating flanges of the pipeline components that the dismantling joint joins to one another.

As the volume of material in a disc or annular ring is a function of the square of the diameter of the disc or ring, a reduction in the outside diameter significantly reduces the amount of material in the disc or ring, which significantly reduces the weight of the disc or ring. Therefore, as a consequence of the dismantling joint according to the present invention having smaller flanges than prior art dismantling joints, the weight of the dismantling joint according to the present invention is significantly less than prior art dismantling joints. Reduction in the length of the dismantling joint according to the present invention is achieved by the compact nature of its design. This has a direct effect on the weight and cost of the unit, and also reduces the cost of the tie-bolts used to secure the mating flanges of the components joined to one another. The combined effects of these material savings results in a lighter more economic design that is able to utilise more expensive, but desirable materials such as stainless steel for critical components resulting in a low maintenance long life application in adverse conditions.

For applications requiring a large diameter, high pressure joint, it is possible to further reduce the material required to produce a dismantling joint according to the present invention compared to the amount of material required for a prior art dismantling joint. The flanges of prior art dismantling joints are designed to withstand significant bending moments caused by the tie-bolts that secure the flanges to the mating flanges of the joined pipeline components. Because the end flanges of the dismantling joint according to the present invention are not subjected to the same high bending stress as the flanges of prior art dismantling joints, the design thickness of the flanges of the dismantling joint according to the present invention can be based primarily on the gasket compressive load (i.e. the load exerted on the flanges when they compress the gaskets between the dismantling joint and the mating flanges of the joined components). This results in thinner flanges for the dismantling joint according to the present invention for the same pipeline pressure. All of the above-mentioned factors reduce the manufacturing cost, material used, and weight of the dismantling joint according to the present invention when compared to prior art dismantling joints.

The dismantling joint according to the present invention is not affected by flange rotation as the longitudinal compressive forces on the joint are counteracted by the compression of the bolts 125, which are located at the centre of the gasket line of action, and which therefore produce no bending stress on the end flanges of the joint. This means that the end flanges remain flat/unbent so that they can provide good support across the width of the gasket face. Although flange rotation will still be apparent on the mating conventional flange of the joined pipeline components, the mating gasket joint will be significantly less than the rotation of a conventional flange joint. A significant effect of this is a reduction in the wetted surface area of the flange face, reducing the area of the flanges that are exposed for potential corrosion.

Dismantling joints are classified as either restrained or non-restrained depending on whether they are capable of transmitting longitudinal force or not. The restrained type includes a Sub-type of partially restrained types if their restraint system does not allow them to take the full pipeline thrust generated by a dead end cap or 90 degree bend. Non-restrained dismantling joints, are generally cheaper than a restrained type because of their simpler construction. The dismantling joint according to the present invention is classified as a fully restrained system, but it can also be used in nearly all non-restrained applications as well.

It will be appreciated that in nearly all situations, mating flanges of pipeline components will be installed with some angular inaccuracy, i.e. the flange faces of the mating flanges might not be exactly parallel to each other, resulting in joint deflection. The dismantling joint according to the present invention accommodates some joint deflection by providing the heads 127 of the compression bolts 125 with a spherical contact surface, and by providing relief on other components which provides space for the various component rotations.

The modular nature of the dismantling joint according to the present invention means that it is easy to incorporate into other pipeline fittings, e.g. valve bodies where the flanged end of the valve body can be easily modified to function as the flange of the flange adaptor or flange spigot of the dismantling joint making it possible to combine the valve and the dismantling joint into a single unit. An advantage of combining the dismantling joint according to the present invention with another component such as a valve is that it eliminates one of the gasket joints of the dismantling joint, and one flange component, and makes the entire assembly shorter than it would otherwise be.

The dismantling joint according to the present invention can be used in all flange applications and is not limited to use in a particular industry. For example, it could be used in the water, waste water, oil, gas, chemical, and process industries. The materials from which the flange and ring seal are made may need to be altered to enable the joint to be used in a particular application. The various components of the dismantling joint may be manufactured from a material selected for the particular application, such as, for example, steel, stainless steel, and/or ductile cast iron. The manufacture of the components of the dismantling joint according to the present invention is similar to that of prior art dismantling joints in that they can be cut, cast, machined, or otherwise fabricated from selected raw materials.

Active components of the dismantling joint according to the present invention are under compressive loading once the dismantling joint has been installed in a pipeline. However, the compressive load is lower than that found in prior art dismantling joints. The dismantling joint according to the present invention may be installed in a similar manner to prior art dismantling joints in that the sealing faces of the pipeline and component flanges are secured to the mating faces of the dismantling joint to produce a leak-proof seal in the pipeline.

During installation of the dismantling joint according to the present invention, the joint is placed between the pipeline and component flanges. The bolts 125 of the joint are screwed out/unscrewed so that the flange adaptor and the flanged spigot are pushed into contact with the flanges of the pipeline components. This action also compresses the ring seal of the joint so that it provides a leak-proof seal between the pipe section of the flanged spigot and the flange of the flange adaptor. The bolts of the joint, are tightened to a predetermined torque.

Not all dismantling joints according to the present invention require a seal backing plate ring. The seal backing plate is only required for flange sizes where the holes, in the relief ring or the threaded ring may encroach in the area of the ring seal space, preventing the seal from being compressed evenly. Similarly to prior art dismantling joints, the dismantling joint according to the present invention can tolerate axial misalignment or angular deflection between the flange faces of the pipeline and component flanges. This is achieved by the amount that the bolts 125 are adjusted, and by a predetermined amount of clearance between the components of the joint that interact with the flanged spigot component of the joint. To remove the dismantling joint, the aforementioned installation procedure is reversed.

The provision of a seal containment ring in the dismantling joint according to the present invention provides an alternative option to using a groove in the flange adaptor to provide a sealing cavity to contain the ring seal. The seal containment ring also allows for easy removal of the ring seal so that it is easier to shorten the dismantling joint. Where a seal containment ring is not provided, the seal ring can become wedged, seized, or stuck over time, and make it difficult for the joint to be removed. The ability to move the seal containment ring relative to the flange adaptor aids in the removal of the seal.

The dismantling joint according to the present invention is simpler, smaller and lighter in design and construction than prior art dismantling joints. As a consequence, it is more cost effective to manufacture and easier to install compared with prior art dismantling joints. This is able to provide the dismantling joint according to the present invention with a competitive advantage in the market place. It is also shorter in length compared with existing dismantling joints that are designed for use with large diameter pipelines, and therefore allows pipeline structures to be reduced in size, which can save costs.

Where existing dismantling joints need to be replaced due to corrosion or damage, the dismantling joint according to the present invention can be easily lengthened to ensure that it is able to be fitted between the flanges of the pipeline components to be joined to one another. In contrast, existing dismantling joints that are too long cannot be shortened and therefore cannot be installed. Dismantling joints come in a wide range of diameters, from 100 mm to greater than 2 metres. The competitive advantage of the dismantling joint according to the present invention over prior art dismantling joints increases as the diameter of the joint increases.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth. Prior art referred to herein does not necessarily form part of the common general knowledge in the art.

The invention claimed is:

1. An assembly comprising;
a first pipeline component and a second pipeline component, connectable to one another along a common axis by a plurality of connectors spaced from the common axis and each of the first and second pipeline components having a sealing face opposed to the other;
a dismantling joint having a first half and a second half, each half having a central axis, and the first half including a cylindrical spigot having an outer face and a flange extending outwardly from the outer face of the spigot, the flange having an inner face and an outer face remote from the inner face, and the second half including a socket adapted to slidably receive therein the spigot of the first half, the socket having a proximal end and a distal end remote from the proximal end, the proximal end being opposed to the inner face of the flange of the first half; and
forcing means arranged between the inner face of the flange of the first half and the proximal end of the spigot to engage the inner face of the flange of the first half and the proximal end of the socket of the second half adjacent the outer face of the spigot to force the first and second halves away from each other and into sealing engagement with the sealing faces of the first and second pipeline components, the sealing faces each having an inner edge and an outer edge, and wherein the forcing means is arranged about a pitch circle spaced from the central axes such that a spacing of the pitch circle is less than the spacing of the connectors when the central axes of the dismantling joint are aligned with the common axis of the first and second pipeline components, the pitch circle of the forcing means also being aligned centrally between the inner and outer edges of the sealing faces of the first and second pipeline components.

2. The assembly according to claim 1, wherein the spigot is integrally formed.

3. The assembly according to claim 2, further comprising a flange adaptor having a flange for receiving a spigot portion of the flanged spigot, a seal, and a follower for pressing the seal against the spigot portion and the flange adaptor.

4. The assembly according to claim 3, wherein the follower includes a ring having dimensions commensurate with the dimensions of the flange adaptor.

5. The assembly according to claim 1, further comprising a flange adaptor for receiving the spigot, wherein the forcing means includes a plurality of threaded rods and complementary threaded apertures extending axially into or through either or both the flange of the first half and the flange adaptor.

6. The assembly according to claim 5, wherein the plurality of threaded rods include bolts having a threaded portion, a non-threaded portion extending axially from the threaded portion, and a compression face on an end of the non-threaded portion remote from the threaded portion.

7. The assembly according to claim 6, wherein the compression faces of the bolts are domed to permit engagement with a bearing face at a non-perpendicular angle.

8. A dismantling joint for joining a first pipeline component to a second pipeline component, the first and second pipeline components being connectable to one another, the dismantling joint including:
a flanged spigot having a pipe;
a flange adaptor that receives the pipe of the flanged spigot;
a ring seal for sealing between the flanged spigot and the flange adaptor;
a follower for pressing the ring seal against the flanged spigot and the flange adaptor;
a seal containment ring positioned between the follower and the flanged adaptor, the seal containment ring surrounding the pipe of the flanged spigot and defining a seal cavity therebetween, the ring seal being positioned within the seal cavity; and
a plurality of bolts spaced about a central axis and screwed into a plurality of threaded holes such that:
the bolts extend longitudinally between the flanged spigot and the follower and the bolts are able to be partially unscrewed for moving the flanged spigot and the follower away from each other so that the flanged spigot is able to apply a first force against the first pipeline component, so that the flange adaptor is able to apply a second force against the second pipeline component, and so that the follower is able to press the ring seal against the flanged spigot and the flange adaptor, and wherein the seal containment ring inhibits the ring seal from spreading radially outward when pressed.

9. The dismantling joint according to claim 8, wherein the dismantling joint further includes a spigot mating face on the flanged spigot and an adaptor mating face on the flange adaptor whereby the seal is compressed to a compressive load when the spigot mating face is mated against the adaptor mating face.

10. The dismantling joint according to claim 8, wherein the bolts have external surfaces that face away from the central axis and define a maximum bolt radius of the bolts from the central axis, a plurality of connectors, which join the first and second pipeline components, having exterior surfaces that face the central axis and are located a distance away from the central axis, the distance being greater than the maximum bolt radius.

11. The dismantling joint according to claim 8, wherein the seal containment ring has an axial thickness measured along the central axis that is essentially equal to an axial thickness of the ring seal.

12. A dismantling joint for joining a first pipeline component to a second pipeline component, the first and second pipeline components being connectable to one another along a common axis, the dismantling joint including:

- a flanged spigot having an end face configured to apply a first force against the first pipeline component, wherein the end face is defined between an inner flange edge and an outer flange edge and faces in a direction that is parallel to the common axis;
- a flange adaptor that receives the flanged spigot;
- a seal for sealing between the flanged spigot and the flange adaptor;
- a follower for pressing the seal against the flanged spigot and the flange adaptor; and
- a plurality of bolts screwed into a plurality of threaded holes spaced about a central axis and such that the bolts extend longitudinally between the flanged spigot and the follower such that the bolts are able to be partially unscrewed for moving the flanged spigot and the follower away from each other so that the flanged spigot is able to apply the first force against the first pipeline component, so that the flange adaptor is able to apply a second force against the second pipeline component, and so that the follower is able to press the seal against the flanged spigot and the flange adaptor, and
- wherein the bolts are arranged about a pitch circle that is aligned between the inner and outer flange edges of the end face, wherein the inner and outer flange edges are coplanar on a plane that is perpendicular to the common axis.

13. The dismantling joint according to claim 12, wherein the end face has an essentially planar surface extending between the inner and outer flanged edges.

14. The dismantling joint according to claim 12, wherein the pitch circle is aligned centrally between the inner and outer flange edges and the flanged spigot has circumferentially spaced holes that open to the end face.

15. The dismantling joint according to claim 12, further comprising a gasket disposed between the first pipeline component and the end face.

\* \* \* \* \*